United States Patent

Saga

[11] Patent Number: 5,103,896
[45] Date of Patent: Apr. 14, 1992

[54] AIR-CONDITIONING SYSTEM AND OPERATION METHOD THEREOF

[75] Inventor: Hideo Saga, Yokohama, Japan

[73] Assignee: Kabushiki Kaisha Toshiba, Kawasaki, Japan

[21] Appl. No.: 679,097

[22] Filed: Apr. 2, 1991

[30] Foreign Application Priority Data

Apr. 2, 1990 [JP] Japan .................................. 2-84940

[51] Int. Cl.⁵ ............................................. F25B 29/00
[52] U.S. Cl. .......................................... 165/2; 165/22; 165/26; 165/27; 165/48.1; 236/1 B; 236/1 C
[58] Field of Search ..................... 165/16, 22, 26, 27, 165/48.1, 2; 236/1 B, 1 C

[56] References Cited

U.S. PATENT DOCUMENTS

| | | | |
|---|---|---|---|
| 3,179,162 | 4/1965 | McFarlan | 165/22 |
| 3,774,674 | 11/1973 | McFarlan | 165/22 |
| 3,853,172 | 12/1974 | McFarlan | 165/22 |
| 4,300,623 | 11/1981 | Meckler | 165/22 |
| 4,473,107 | 9/1984 | Fairbrother et al. | 165/22 |
| 4,633,937 | 1/1987 | Zilbermann | 165/22 |

Primary Examiner—John K. Ford
Attorney, Agent, or Firm—Oblon, Spivak, McClelland, Maier & Neustadt

[57] ABSTRACT

An air conditioning for a room of a high-rise building, for example, is carried out in consideration of the difference in temperatures in a central interior zone and a circumferential perimeter zone of the room changeably to heating and cooling in accordance with an operation mode and a room temperature set point. In the actual air conditioning, a room temperature in the interior zone is first set and an actual room temperature in the perimeter zone is detected. The set room temperature in the interior zone is compared with the detected room temperature in the perimeter zone to thereby select an operation mode (heating or cooling) of air conditioning of the perimeter zone by an operation mode selecting unit. A correction value of the room temperature in the perimeter zone is calculated in accordance with operation modes in the interior and perimeter zones and a room temperature in the perimeter zone is set by adding the correction value to the set room temperature in the interior zone, and supplying the set room temperatures in the interior and perimeter zone to an air conditioning body of the air conditioning system through air supply units into the interior zone and the perimeter zone, respectively.

6 Claims, 3 Drawing Sheets

AIR-CONDITIONING SYSTEM AND OPERATION METHOD THEREOF

BACKGROUND OF THE INVENTION

The present invention relates to an air conditioning system for air-conditioning a central interior zone and a circumferential perimeter zone of a room of a high-rise building or the like and an operating method of the air conditioning system, and more particularly relates to an air conditioning system having an operation mode (cooling/heating) of the perimeter zone in a room and an operation method thereof.

Recently, there is proposed an air conditioning system for a high-rise building or the like, which operates to carry out an air conditioning of a room divided into a central interior zone and a circumferential perimeter zone each in accordance with an operation mode (cooling/heating) and a room temperature set point.

The reason for such systems is the fluctuation of air conditioning loads due to a seasonal condition of summer, winter and the intermediate seasons thereof varies largely with the central interior zone and the circumferential perimeter zone in the high-rise building and the like, a proper air conditioning operation according to each air conditioning load must be carried out.

That is, in the interior zone, since the internal load works so much, the daily temperature change is not so conspicuous between summer and winter, and an initial heating at the time of starting an air conditioning system is necessary in the morning. Thus fixed quantity of cooling load will do in the daytime.

On the other hand, an air conditioning load of the perimeter zone is kept large as a result of the daily temperature change due to an influence of atmospheric temperature and solar radiant heat.

Therefore, in a prior art air conditioning system of this kind, an operation mode and a room temperature set point are set separately for the respective zones, and different air conditioning operations are carried out separately.

However, in such prior art air conditioning system, room temperature set points of both interior zone and perimeter zone are each set separately and, therefore in case both zones are subjected concurrently to air conditioning with the one cooling and the other heating, an energy loss may arise due to a heat transfer in the room.

Consequently, an operating temperature width-area (blind sector) is set to each heat regulator of both zones. However, this may increase a temperature difference between both zones, thus hurting a comfortableness of people moving therebetween.

Further, the perimeter zone is susceptible to solar radiant heat (direct sunlight), and thus an effective temperature is capable of becoming high. However, a temperature sensor of this zone is intended for detecting the room air temperature and not for detecting the effective temperature. Therefore the difference between an atmospheric temperature of the perimeter zone and the effective temperature is very large, thus deteriorating the comfortableness.

SUMMARY OF THE INVENTION

An object of the present invention is to substantially eliminate defects or drawbacks encountered in the prior art and to provide an air conditioning system and a method for carrying out the air conditioning operation in a selected operation mode capable of enhancing the comfortableness of the perimeter zone in a room.

This and other objects of the present invention can be achieved, in one aspect, by providing an air conditioning system for air-conditioning a central interior zone and a circumferential perimeter zone of a room changeably to heating and cooling in accordance with an operation mode and a room temperature set point, the air conditioning system comprises a first room temperature setter for setting a room temperature in the interior zone, a first room temperature detector for detecting the room temperature in the interior zone, a first regulating unit operatively connected to the first room temperature setter and a detector for regulating an air conditioning operation in the interior zone, a first air supply unit operatively connected to the first room temperature regulating unit for supplying air into the interior zone in accordance with the regulated air conditioning operation, second room temperature setter for setting a room temperature in the perimeter zone, a second room temperature detector for detecting the room temperature in the perimeter zone, a second regulating unit operatively connected to the second room temperature setter and detector for regulating an air conditioning operation in the perimeter zone, the second room temperature regulating unit operatively connected to the first room temperature regulating unit, an operation mode selecting unit for selecting an operation mode of the perimeter zone in comparison of the detected room temperature in the perimeter zone with the set room temperature in the interior zone, a correction value setter operatively connected to the second room temperature setter for applying a correction value preliminarily stored therein in combination of an operation mode of the interior zone with an operation mode of the perimeter zone selected by the operation mode selecting unit, and a second air supply unit operatively connected to the second room temperature regulating unit for supplying an air into the perimeter zone in accordance with the regulated air conditioning operation.

In another aspect of the present invention, there is provided a method of air-conditioning a central interior zone and a circumferential perimeter zone of a room changeably to heating and cooling in accordance with an operation mode and a room temperature set point, the air conditioning method comprising the steps of setting a room temperature in the interior zone, detecting a room temperature in the perimeter zone, comparing the set room temperature in the interior zone with the detected room temperature in the perimeter zone, selecting an operation mode of air conditioning of the perimeter zone, calculating a correction value of the room temperature in the perimeter zone in accordance with operation modes in the interior and perimeter zones, setting a room temperature in the perimeter zone by adding the correction value to the set room temperature in the interior zone, and supplying the set room tempertures in the interior and perimeter zone to an air conditioning body of the air conditioning system According to the characteristics described above of the present invention, when an air conditioning operation of the interior zone is carried out according to a necessary room temperature set point and operation (cooling/heating) mode, the room temperature set point of the interior zone is compared with a detected room temperature value of the perimeter zone by the operation mode selecting means, and an operation mode of the perimeter zone is selected.

Further, a correction value for correcting the difference between an effective temperature and the detected room temperature value is obtained first by the room temperature setter from a combination of operation modes of both zones, and further the correction value is added to that of the interior zone, thus the room temperature set point of the perimeter is obtained and so set.

Accordingly, an air conditioning operation of the perimeter zone is carried out according to the operation mode selected by the operation mode selecting means and the room temperature set point set by the room temperature setter.

Then, since a room temperature set point of the perimeter zone is set by adding the correction value for correcting the difference between an effective temperature and a detected room temperature value to the room temperature set point of the interior zone, a temperature difference between both zones is kept within the correction value for correcting an effective temperature, thus enhancing comfortableness.

BRIEF DESCRIPTION OF THE DRAWINGS

For a better understanding of the present invention and to show how the same is carried out, reference is first made to, by way of a preferred embodiment, the accompanying drawings, in which.

DESCRIPTION OF THE PREFERRED EMBODIMENT

One embodiment of the present invention will now be described hereunder with reference to the accompanying drawings.

Figure 1:
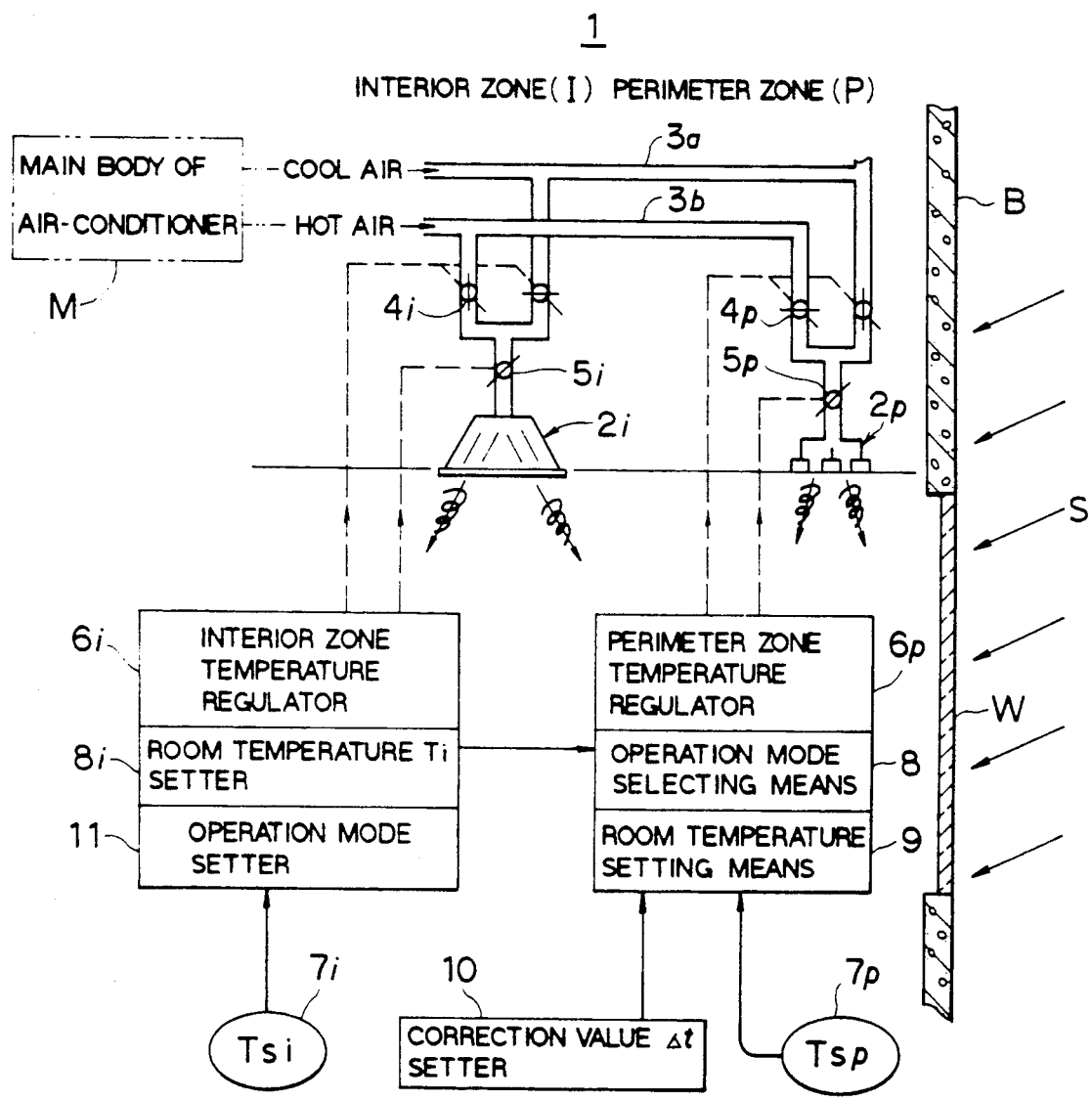
FIG. 1 is a structural diagram of an air conditioning system according to the present invention.

Referring to FIG. 1, an air conditioning system 1 is arranged in room of a high-rise building, for example, which is divided into a central interior zone I and a circumferential perimeter zone P and the air conditioning system 1 includes a plurality of interior blow-off units 2i . . . , for example, provided on a ceiling of the interior zone I, and a plurality of perimeter blow-off units 2p . . . provided on a ceiling of the perimeter zone P.

Each blow-off unit 2p comprises a slender rectangular square tube disposed along an inside of a window W on an outer wall B of a high-rise building or the like and is constructed to blow off cold air or hot air so as to screen a radiant heat of the sun light S coming inward through glass of the window W like a so-called air curtain.

These blow-off units 2i . . . and 2p . . . are connected to, for example, cooling/heating air conditioner body M, usually disposed outside the room, through cold air or hot air ducts 3a and 3b, respectively, and cold air and hot air are transferred to the blow-off units 2i and 2p each from the air conditioner body M.

Then, the blow-off units 2i and 2p are provided with changeover dampers or valves 4i and 4p for shifting a blowout of cold air and hot air, and airflow control dampers or valves 5i and 5p for controlling a blast of cold and hot air, respectively.

An interior temperature regulator 6i is further provided in the interior zone I, and a perimeter temperature regulator 6p is provided in the perimeter zone P, the interior temperature regulator 6i having an interior room temperature sensor 7i for detecting room temperature of the interior zone I, an interior room temperature setter 8i for setting room temperature of the interior zone I, and an operation mode (cooling/heating) setter 11.

The perimeter temperature regulator 6p incorporates therein an operation mode selecting means 8 for selecting an operation mode (cooling/heating) of the perimeter zone P, and has a perimeter room temperature setting means 9 for detecting room temperature of the perimeter zone P and a correction value setter 10 in which a correction value $\Delta t$ is loaded modifiably of writing.

The operation mode selecting means 8 selects an operation mode of the perimeter zone P from comparing a room temperature set point of the interior zone I with a detected room temperature value on a side of the perimeter zone P.

That is, the operation mode selecting means 8 reads a room temperature set point Ti of the interior zone I from the room temperature setter 8i of the interior zone I, reads a detected room temperature value Tsp of the perimeter zone P from the room temperautre sensor 7p of the perimeter zone P, and selects the operation mode of the perimeter zone P to cooling when the following equation (1) holds and a heating operation when the inequality sign in the equation is inverted.

$$Tsp \geq Ti \pm 1.5 \quad (1)$$

In the equation (1), numeral 1.5 indicates a differential.

Then, the room temperature setting means 9 reads the correction value $\Delta t$ set beforehand in the correction value setter 10 from a combination of the operation mode of the interior zone I with the operation mode of the perimeter zone P selected by the operation mode selecting means 8, adds the correction value $\Delta t$ to the room temperature set point of the interior zone I to obtain the room temperature set point of the perimeter zone P, and sets the room temperature of the perimeter temperature regulator 6p.

That is, the room temperature setting means 9 obtains the room temperature set point of the perimeter zone P by adding the correction value $\Delta t$ to the room temperature set point Ti read from the room temperature setter 8i of the perimeter zone P through the following equation (2), thus setting the room temperature of the perimeter temperature regulator 6p.

$$Tp = Ti + \Delta t \quad (2)$$

Then, the correction value setter 10 stores various correction values $\Delta t_1$ to $\Delta t_4$ set beforehand according to various combinations of operation modes of the interior zone I and the perimeter zone P.

Each correction value is utilized for the correction of the difference between an effective temperature of the perimeter zone P due to a radiant heat of the direct sunlight S and others and a detected room temperature value of the room temperature sensor 7p and is set beforehand empirically according to air current at the time of air conditioning operation, azimuth, working state, clothing state and other conditions.

Figure 2:
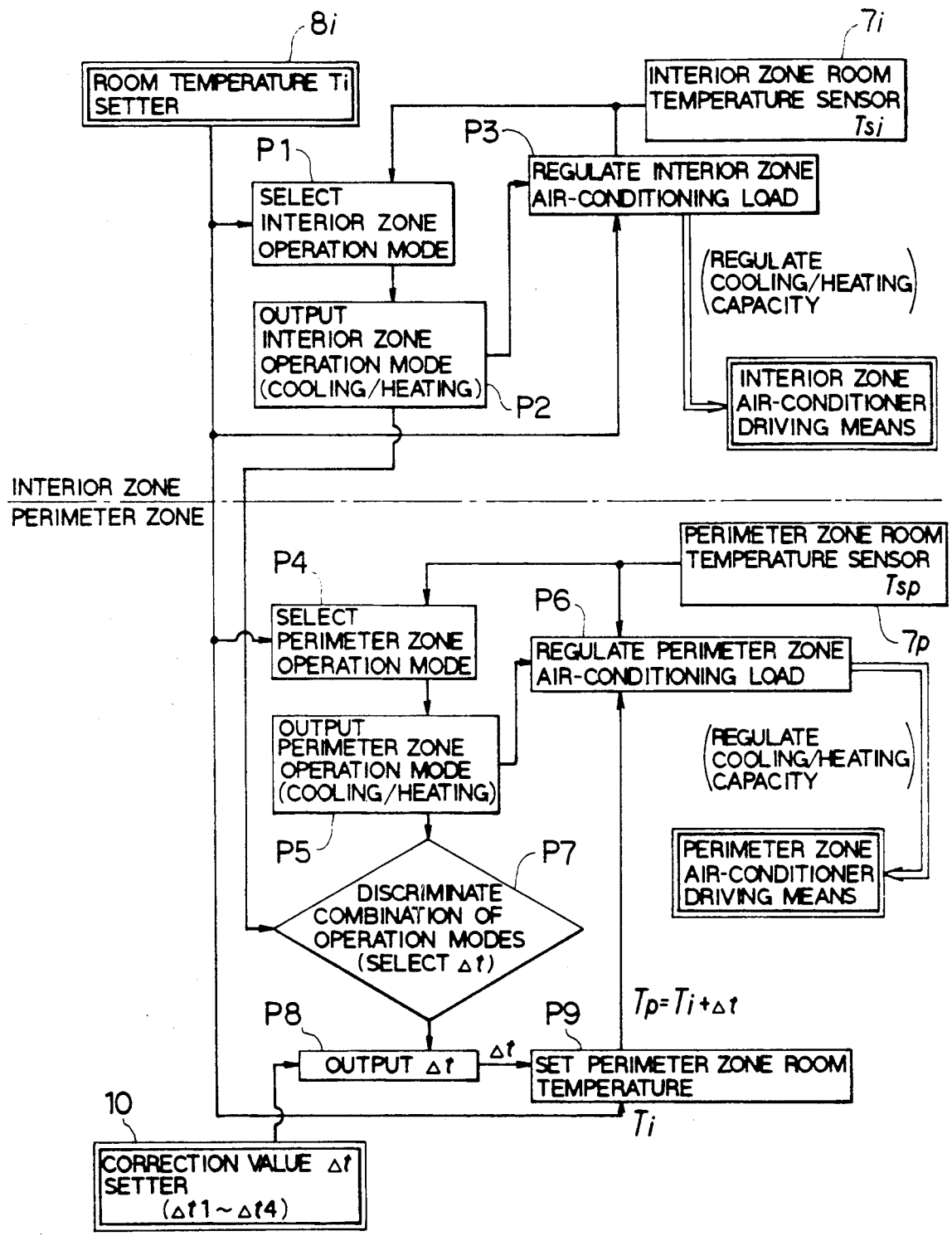
FIG. 2 is a flowchart representing steps for carrying out the present invention.
Figure 3A:
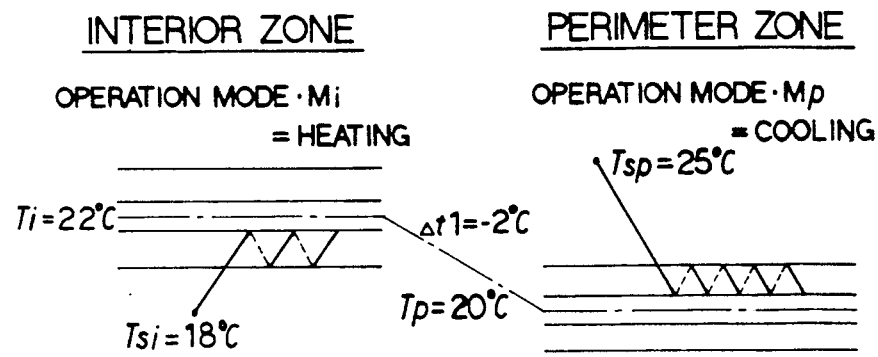
FIGS. 3A to 3D show room temperature distribution based on four combined operation modes according to the present invention.
Figure 3B:
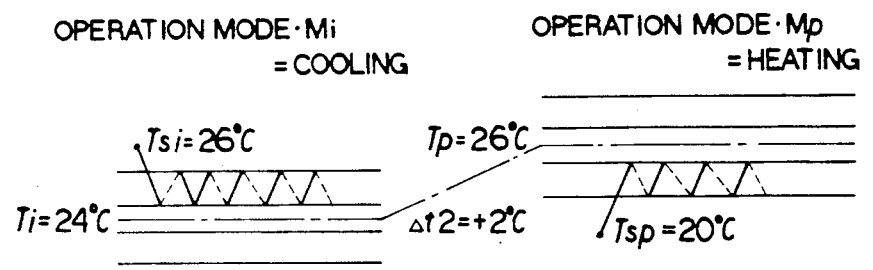
Figure 3C:
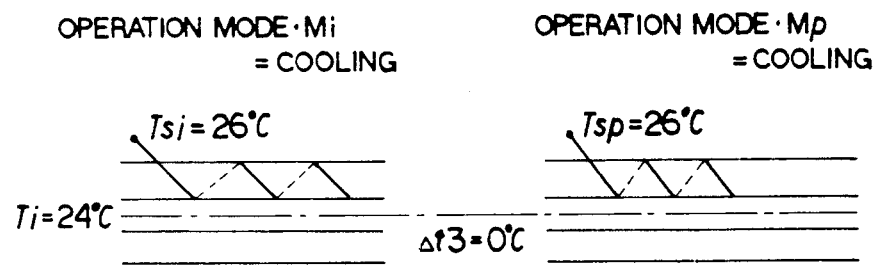
Figure 3D:
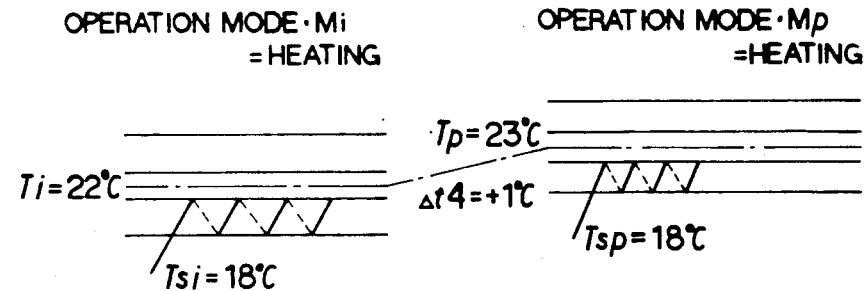

An air conditioning operation according to the present embodiment will be described with reference to a flowchart of FIG. 2.

In this flowchart, P1 to P9 indicate the respective steps.

First, in step P1, when an operation mode of the interior zone I is selected manually, the operation mode pulsing signal is generated in step P2 and the procedure steps forward to step P3.

In the stpe P3, an operation mode pulsing signal of the interior zone I, a room temperature set point signal from the detected room temperature value signal from the room temperature sensor 7i of the interior zone I are received, an air-conditioning load of the interior zone I is thus obtained, and the air conditioner body M is driven according to the air-conditioning load.

Accordingly, in the interior zone I, an air-conditioning operation is carried out so that a detected room temperature value of the room temperature sensor 7i reaches a room temperature set point set by the room temperature setter 8i.

On the other hand, in step P4, an operation mode (cooling/heating) of the perimeter zone P is selected by the operation mode selecting means 8 in the perimeter zone P.

When the operation mode of the perimeter zone P is selected in the step P4, an operation mode pulsing signal is provided to steps P6 and P7 in the step P5.

In the step P6, the selected operation mode of the perimeter zone P and the detected room temperature value Tsp of the perimeter zone P from the room temperature sensor 7p of the perimeter zone P are read to obtain an air-conditioning load respectively and the air conditioner is driven on the air-conditioning loads.

Further in the step P7, the correction value $\Delta t$ is selected by the correction value setter 10 from a combination of the operation mode of the interior zone I, and is read in step P8.

Thus, the operation mode on a side of the perimeter zone P is selected and the room temperature set point is then set.

Next, some examples of a concrete operating method of the present embodiment will be described with reference to TABLE 1 and FIGS. 3A to 3D. Then in TABLE 1, reference character H of the operation mode represents heating, and C represents cooling.

Reference characters a to d in TABLE 1 correspond to FIGS. 3A to 3D, respectively, and here, indicates an operating method when, for example, the morning sun pours in wintertime. That is, in this case an operation mode Mi of the interior zone I is heating, the room temperature set point Ti is 22° C., the detected room temperature value Tsi is 18° C., and the detected room temperature value Tsp of the perimeter zone P is 25° C. An operation mode Mp of the perimeter zone P is selected to the equation (1) mentioned above.

When the operation mode Mp of the perimeter zone P is selected, the correction value $\Delta t_1$ set beforehand is obtained from a combination of the operation mode Mp and the operation mode Mi of the interior zone I, the correction value is then added to the room temperature set point Ti of the interior zone I as shown in the equation (2) mentioned above, and the room temperature set point Tp of the perimeter zone P is set.

The method for setting the operation mode Mp of the perimeter zone P and the room temperature set point Tp applies likewise to each case of b to d following thereto.

Further, the reference character b indicates, for example, a cloudy daytime in wintertime, c indicates a case, for example, where the morning sun is not incident in summertime, and d indicates a case, for example, the morning sun is not incident in wintertime.

As described above, according to the present embodiment, an effective temperature by a radiant heat of the direct sunlight S of the perimeter zone P is corrected according to the correction value $\Delta t$, and the room temperature set point Tp of the perimeter zone P is set automatically, therefore a comfortableness of the perimeter zone P can be enhanced.

It is to be understood that the present invention is not limited to the described embodiment and many other changes and modifications may be made without departing from the scope of the appended claims.

What is claimed is:

1. An air conditioning system for air-conditioning a central interior zone and a circumferential perimeter zone of a room changeably between a heating mode and a cooling mode in accordance with an operation mode and a room temperature set point, the air conditioning system comprising:

a first setting means for setting a room temperature in the interior zone;

a first detecting means for detecting the room temperature in the interior zone;

a first regulating means operatively connected to the first room temperature setting and detecting means for regulating an air conditioning operation in the interior zone;

a first air supply means operatively connected to the first room temperature regulating means for sup-

TABLE 1

| | Interior zone I | | | Perimeter zone P | | | |
|---|---|---|---|---|---|---|---|
| | Operation mode (Mi) | Room temperature set point (Ti) | Room temperature detected value (tsi) | Room temperature detected value (tsp) [tsp ≧ Ti + 1.5] | Operation mode (Mp) | Correction value $\Delta t$ (°C.) | Room temperature set point (Tp) [Tp = Ti + $\Delta t$] |
| a | H | 22° C. | 18° C. | tsp = 25° C.<br>25 ≧ 22 + 1.5<br>(Mi = H and Mp = C) | → Mp = C<br>then $\Delta t_1$) | $\Delta t_1$ =<br>−2 | = 22 − 2 = 20° C. |
| b | C | 24° C. | 26° C. | tsp = 20° C.<br>20 ≦ 24 + 1.5<br>(Mi = C and Mp = H) | → Mp = H<br>then $\Delta t_2$) | $\Delta t_2$ =<br>+2 | = 24 + 2 = 26° C. |
| c | C | 24° C. | 26° C. | tsp = 26° C.<br>26 ≧ 24 + 1.5<br>(Mi = C and Mp = C) | → Mp = C<br>then $\Delta t_3$) | $\Delta t_3$ =<br>0 | = 24 + 0 = 24° C. |
| d | H | 22° C. | 18° C. | tsp = 18° C.<br>18 ≦ 22 + 1.5<br>(Mi = H and Mp = H) | → Mp = H<br>then $\Delta t_4$) | $\Delta t_4$ =<br>+1 | = 22 + 1 = 23° C. | plying an air into the interior zone in accordance with the regulated air conditioning operation:

a second setting means for setting a room temperature in the perimeter zone:

a second detecting means for detecting the room temperature in the perimeter zone:

a second regulating means operatively connected to the second room temperature setting and detecting means for regulating a air conditioning operation in the perimeter zone, said second room temperature regulating means operatively connected to the first room temperature regulating means;

an operation mode selecting means for selecting an operation mode of the perimeter zone by comparison of the detected room temperature in the perimeter zone with the set room temperature in the interior zone:

a correction value setting means operatively connected to the second room temperature setting means for applying a correction value preliminarily stored therein in accordance with an operation mode of the interior zone and an operation mode of the perimeter zone selected by the operation mode selecting means; and a second air supply means operatively connected to the second room temperature regulating means for supplying an air into the perimeter zone in accordance with the regulated air conditioning operation.

2. An air conditioning system according to claim 1, wherein the correction value stored in the correction value setting means is for a correction between an effective temperature in the perimeter zone and the room temperature detected by the second room temperature detecting means.

3. An air conditioning system according to claim 1, wherein said first air supply means includes an air blow unit having a changeover damper and an air supply duct connected to an air conditioner body and said second air supply means includes an air blow unit having a changeover damper and an air supply duct connected to the air conditioner body.

4. A method of air-conditioning a central interior zone and a circumferential perimeter zone of a room changeably to heating and cooling in accordance with an operation mode and a room temperature set point, the air conditioning method comprising the steps of:

setting a room temperature in the interior zone;

detecting a room temperature in the perimeter zone;

comparing the set room temperature in the interior zone with the detected room temperature in the perimeter zone;

selecting an operation mode of air conditioning of the perimeter zone;

calculating a correction value of the room temperature in the perimeter zone in accordance with operation modes in the interior and perimeter zones;

setting a room temperature in the perimeter zone by applying the correction value to the set room temperature in the interior zone; and applying the set room temperatures in the interior and perimeter zone to an air conditioning body of the air conditioning system.

5. A method according to claim 4, wherein the room temperature in the perimeter zone is set by adding the correction value of the room temperature in the perimeter zone to the set room temperature in the interior zone.

6. A method according to claim 4, wherein the correction is for a correction between an effective temperature in the perimeter zone and the detected room temperature in the perimeter zone.

* * * * *